(12) United States Patent
Lin et al.

(10) Patent No.: US 10,685,611 B2
(45) Date of Patent: Jun. 16, 2020

(54) PRE-CHARGING CIRCUIT AND PRE-CHARGING METHOD APPLIED TO SOURCE DRIVER

(71) Applicant: Raydium Semiconductor Corporation, Hsinchu (TW)

(72) Inventors: Po-Cheng Lin, Hsinchu (TW); Hua-Ming Lu, Taoyuan (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 23 days.

(21) Appl. No.: 16/122,987

(22) Filed: Sep. 6, 2018

(65) Prior Publication Data
US 2019/0080657 A1 Mar. 14, 2019

(30) Foreign Application Priority Data
Sep. 8, 2017 (TW) .............................. 106130876 A (51) Int. Cl.
*G09G 3/36* (2006.01)
*G02F 1/133* (2006.01)

(52) U.S. Cl.
CPC ....... *G09G 3/3607* (2013.01); *G02F 1/13306* (2013.01); *G09G 3/3688* (2013.01); *G09G 2310/0248* (2013.01); *G09G 2310/0251* (2013.01); *G09G 2310/0264* (2013.01); *G09G 2320/0252* (2013.01); *G09G 2320/0276* (2013.01)

(58) Field of Classification Search
CPC .............. G09G 3/3607; G09G 3/3688; G09G 2310/0251; G09G 2310/0264; G09G 2320/0276; G09G 2310/0248; G09G 2320/0252; G02F 1/13306
See application file for complete search history.

(56) References Cited

U.S. PATENT DOCUMENTS

2007/0187762 A1* 8/2007 Saiki ................... G02F 1/13452
257/355

* cited by examiner

*Primary Examiner* — Yaron Cohen (57) ABSTRACT

A display driving apparatus applied to a panel is disclosed. The panel displays a first image with a first refresh rate. A first refresh cycle corresponding to the first refresh rate includes a refresh period and at least one non-refresh period. The display driving apparatus includes a real-time determination module and a data processing module. The real-time determination module is coupled to the panel and used to immediately determine whether the panel wants to replace the originally displayed first image with a second image during the first refresh cycle. The data processing module is coupled to the real-time determination module and the panel. If a determination result of the real-time determination module is yes, the data processing module immediately controls the panel to start to display the second image at a first time during the first refresh cycle.

8 Claims, 4 Drawing Sheets

PRE-CHARGING CIRCUIT AND PRE-CHARGING METHOD APPLIED TO SOURCE DRIVER

BACKGROUND OF THE INVENTION

1. Field of the Invention

The invention relates to a source driver of a display; in particular, to a pre-charging circuit and a pre-charging method applied to a source driver.

2. Description of the Prior Art

Figure 1:
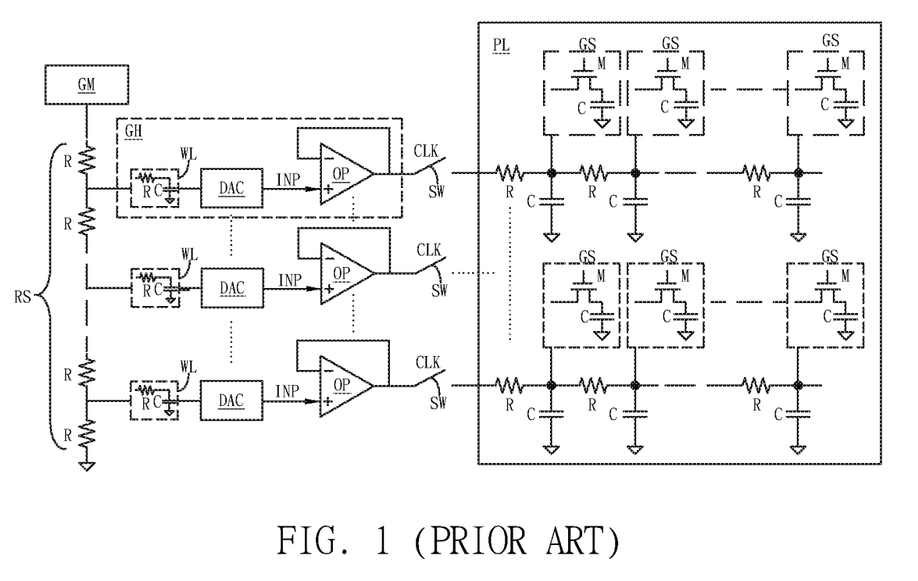
FIG. 1 illustrates a schematic diagram of a conventional source driver in a display.

In general, as the resolution of liquid crystal display panels becomes higher and higher (for example, 4K2K or 8K panels), there is a technical problem that the charging time for liquid crystal display panels is becoming shorter and shorter. As shown in FIG. 1, the input signal INP of the operational amplifier OP in each channel CH is affected by loads such as gamma resistance string RS, wire loading WL and digital analog conversion circuit DAC, so that it is impossible to quickly change to the ideal potential, thus causing the operational amplifier OPA to fail to charge the liquid crystal display panel PL within a limited charging time.

Figure 2:
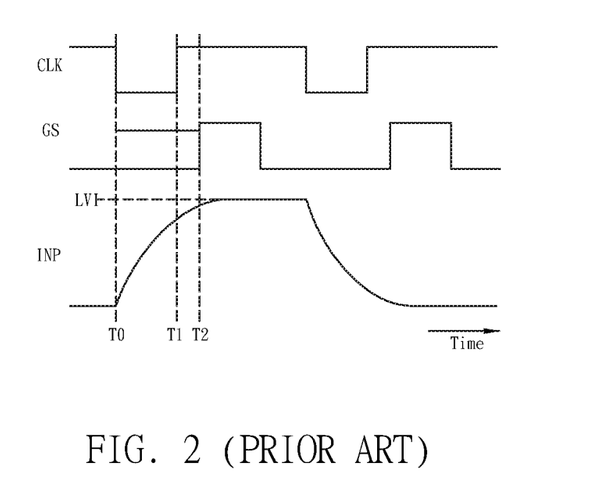
FIG. 2 illustrates a timing diagram of the input signal of the operational amplifier failing to reach the ideal voltage level when the gate of the transistor is conducted.

As shown in FIG. 2, when the gate G of the transistor TFT is turned on, the input signal INP of the operational amplifier OPA still does not reach the ideal voltage level LVI. Therefore, even if the speed of the operational amplifier OPA is fast enough, it is still limited by the input signal INP and the charging of the liquid crystal display panel PL cannot be completed within a limited charging time, so that the liquid crystal display panel PL cannot display the picture normally. This issue still needs to be overcome.

SUMMARY OF THE INVENTION

Therefore, the invention provides a pre-charging circuit and a pre-charging method applied to a source driver to solve the above-mentioned problems of the prior arts.

A preferred embodiment of the invention is a pre-charging circuit applied to a source driver. In this embodiment, the source driver is coupled to a liquid crystal display panel. The source driver includes a digital-analog converter and an operational amplifier. The operational amplifier includes a first input terminal, a second input terminal and an output terminal. The first input terminal is coupled to the output terminal and the second input terminal is coupled to the digital-analog converter. The pre-charging circuit includes a pre-charging control unit and a pre-charging switch unit. The pre-charging control unit determines whether a changing range of gamma code meets a default condition. If determining result is YES, the pre-charging control unit outputs a control signal. The pre-charging switch unit is coupled between the pre-charging control unit and the second input terminal of the operational amplifier. When the control signal switches the pre-charging switch unit on, the pre-charging switch unit pre-charges an input signal transmitted to the second input terminal of the operational amplifier.

In an embodiment, if the determining result of the pre-charging control unit is NO, the pre-charging control unit does not output the control signal, so that the pre-charging switch unit is switched off and does not pre-charge the input signal transmitted to the second input terminal of the operational amplifier.

In an embodiment, the source driver further comprises a gamma unit coupled to the pre-charging control unit and the pre-charging switch unit respectively, the gamma unit provides the gamma code to the pre-charging control unit and the pre-charging switch unit respectively.

In an embodiment, the pre-charging control unit divides a gray-scale range into N gray-scale regions through (N−1) default gamma codes, N is a positive integer larger than 1, the (N−1) default gamma codes comprise a first default gamma code, . . . , and a (N−1)-th default gamma code arranged from low voltage level to high voltage level; the N gray-scale regions comprises a first gray-scale region, . . . , and a N-th gray-scale region.

In an embodiment, the default condition is that the gamma code is changed from a X-th gray-scale region of the N gray-scale regions to a Y-th gray-scale region of the N gray-scale regions, X and Y are positive integers, and 1≤X, Y≤N and X≠Y.

In an embodiment, the (N−1) default gamma codes correspond to (N−1) pre-charging reference voltages comprising a first pre-charging reference voltage, . . . , and a (N−1)-th pre-charging reference voltage.

In an embodiment, if X<Y, the gamma code is changed from the X-th gray-scale region having relative low voltage level to the Y-th gray-scale region having relative high voltage level, and the pre-charging switch unit pre-charges the input signal transmitted to the second input terminal of the operational amplifier to a (Y−1)-th pre-charging reference voltage.

In an embodiment, if X>Y, the gamma code is changed from the X-th gray-scale region having relative high voltage level to the Y-th gray-scale region having relative low voltage level, and the pre-charging switch unit pre-charges the input signal transmitted to the second input terminal of the operational amplifier to a Y-th pre-charging reference voltage.

Another preferred embodiment of the invention is a pre-charging method applied to a source driver. In this embodiment, the source driver is coupled to a liquid crystal display panel, the source driver includes a digital-analog converter and an operational amplifier. The operational amplifier includes a first input terminal, a second input terminal and an output terminal. The first input terminal is coupled to the output terminal and the second input terminal is coupled to the digital-analog converter. A pre-charging switch unit is coupled to the second input terminal of the operational amplifier. The pre-charging method includes steps of:

(a) determining whether a changing range of a gamma code meets a default condition;

(b) if a determining result of the step (a) is YES, outputting a control signal to switch the pre-charging switch unit on; and (c) the pre-charging switch unit pre-charging an input signal transmitted to the second input terminal of the operational amplifier.

Compared to the prior art, the pre-charging circuit and the pre-charging method of the present invention are applied to a source driver of a liquid crystal display device, when a gamma code requires a large voltage level change to change between different gray scale regions, the pre-charging circuit and the pre-charging method of the present invention will pre-charge the input signal transmitted to the positive input terminal of the operational amplifier to speed up the input signal to the desired voltage level, so that the operational amplifier can charge the liquid crystal display panel within a limited charging time. As a result, the liquid crystal display panel can display the picture normally and the problems encountered in the prior art can be effectively overcome.

The advantage and spirit of the invention may be understood by the following detailed descriptions together with the appended drawings.

DETAILED DESCRIPTION OF THE INVENTION

A preferred embodiment of the invention is a pre-charging circuit. In this embodiment, the pre-charging circuit is applied to a source driver of a liquid crystal display; the source driver is coupled to a liquid crystal display panel to charge the liquid crystal display panel during a charging time.

When the pre-charging circuit of the present invention determines that a changing range of a gamma code covers different gray scale regions, it means that the input signal of the operational amplifier transmitted to the source driver needs to have a large voltage level change. Therefore, the pre-charging circuit will pre-charge the input signal of the operational amplifier transmitted to the source driver to speed up the input signal to the ideal voltage level, so that the operational amplifier receiving the input signal can complete the charging of the liquid crystal display panel within a limited charging time and let the liquid crystal display panel can display the picture properly.

Figure 3:
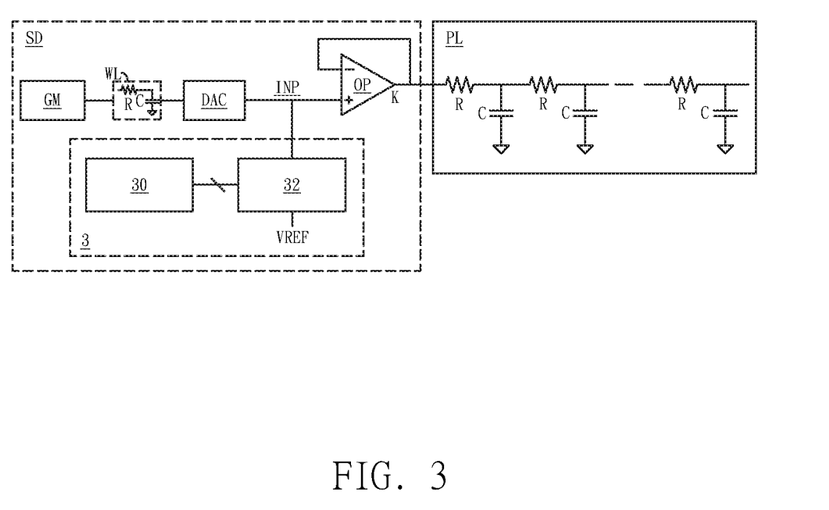
FIG. 3 illustrates a schematic diagram of a pre-charging circuit applied to a source driver of a liquid crystal display in a preferred embodiment of the invention.

Please refer to FIG. 3. FIG. 3 illustrates a schematic diagram of a pre-charging circuit applied to a source driver of a liquid crystal display in a preferred embodiment of the invention. As shown in FIG. 3, the source driver SD includes a gamma unit GM, a digital-to-analog converter DAC, an operational amplifier OP and a pre-charging circuit 3. The operational amplifier OP includes a first input terminal −, a second input terminal + and an output terminal K. The first input terminal − of the operational amplifier OP is coupled to the output terminal K of the operational amplifier OP; the second input terminal + of the operational amplifier OP is coupled to the digital-to-analog converter DAC; the output terminal K of the operational amplifier OP is coupled to the liquid crystal display panel PL; the digital-to-analog converter DAC is coupled between the gamma unit GM and the second input terminal + of the operational amplifier OP; there is a wire load WL between the gamma unit GM and the digital-to-analog converter DAC; the gamma unit GM is coupled to the pre-charging circuit 3; the pre-charging circuit 3 is coupled between the digital-to-analog converter DAC and the second input terminal + of the operational amplifier OP.

In this embodiment, the pre-charging circuit 3 can include a pre-charging control unit 30 and a pre-charging switch unit 32. The pre-charging control unit 30 is coupled between the gamma unit GM and the pre-charging switch unit 32; the pre-charging switch unit 32 is coupled between the digital-to-analog converter DAC and the second input terminal + of the operational amplifier OP; the pre-charging switch unit 32 is also coupled to a pre-charging reference voltage VREF.

Figure 4:
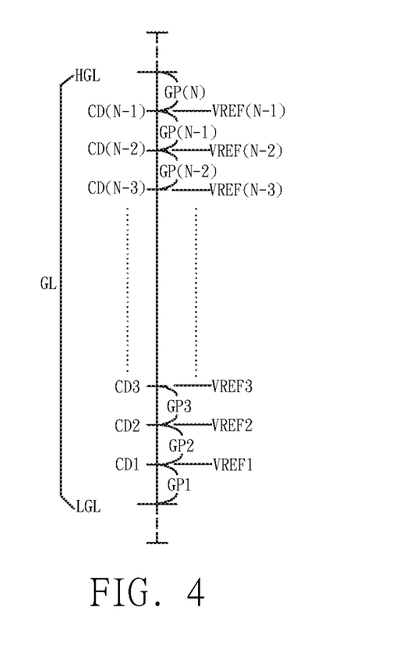
FIG. 4 illustrates a schematic diagram of dividing a gray-scale range into N gray-scale regions through (N−1) default gamma codes and the (N−1) default gamma codes corresponding (N−1) pre-charging reference voltages respectively.

As shown in FIG. 4, the pre-charging control unit 30 can divide entire gray-scale range GL between a highest gray-scale HGL and a lowest gray-scale LGL into N gray-scale regions GP1~GPN through (N−1) default gamma codes CD1~CD(N−1) and the (N−1) default gamma codes CD1~CD(N−1) can correspond to (N−1) pre-charging reference voltages VREF1~VREF(N−1) respectively, wherein N is a positive integer larger than 1. In detail, the (N−1) default gamma codes CD1~CD(N−1) can include a first default gamma code CD1, . . . , and a (N−1)-th default gamma code CD(N−1) arranged from low voltage level to high voltage level; the N gray-scale regions GP1~GPN can include a first gray-scale region GP1, . . . , an N-th gray-scale region GPN arranged from low voltage level to high voltage level; (N−1) pre-charging reference voltages VREF1~VREF(N−1) can include a first pre-charging reference voltage VREF1, . . . , a (N−1)-th pre-charging reference voltage VREF(N−1) arranged from low voltage level to high voltage level.

The pre-charging control unit 30 is used to determine whether a changing range of the gamma code provided by the gamma unit GM meets a default condition. For example, if the default condition is that the gamma code is changed from a X-th gray-scale region GPX of the N gray-scale regions GP1~GPN to a Y-th gray-scale region GPY of the N gray-scale regions GP1~GPN, wherein X and Y are positive integers, and 1≤X, Y≤N and X≠Y, then the pre-charging control unit 30 will determine whether the gamma code is changed from one gray-scale region to another gray-scale region, namely whether the changing range of the gamma code covers different gray-scale regions.

If a determining result of the pre-charging control unit 30 is NO, it means that the gamma code is only changed in the same gray-scale region; therefore, the pre-charging control unit 30 will not output a control signal CS to the pre-charging switch unit 32, so that the pre-charging switch unit 32 is switched off and does not pre-charge the input signal INP transmitted to the second input terminal + of the operational amplifier OP.

If the determining result of the pre-charging control unit 30 is YES, it means that the gamma code is changed from one gray-scale region (the X-th gray-scale region GPX) to another gray-scale region (the Y-th gray-scale region GPY); therefore, the pre-charging control unit 30 will output the control signal CS to the pre-charging switch unit 32. When the control signal CS switches the pre-charging switch unit 32 on, the pre-charging switch unit 32 will pre-charge the input signal INP transmitted to the second input terminal + of the operational amplifier OP to the pre-charging reference voltage VREF.

It should be further noticed that the determining result of the pre-charging control unit 30 is YES means that the gamma code is changed from one gray-scale region to another gray-scale region; however, it is possible that the gamma code is changed from the gray-scale region having relative low voltage level to the gray-scale region having relative high voltage level or changed from the gray-scale region having relative high voltage level to the gray-scale region having relative low voltage level. That is to say, when the gamma code is changed from the X-th gray-scale region GPX) to the Y-th gray-scale region GPY and X≠Y, there are two possible conditions X<Y and X>Y described as follows:

(1) if X<Y, it means that the gamma code is changed from the X-th gray-scale region GPX having relative low voltage level to the Y-th gray-scale region GPY having relative high voltage level; therefore, the pre-charging switch unit 32 will pre-charge the input signal INP transmitted to the second input terminal + of the operational amplifier OP to a (Y−1)-th pre-charging reference voltage VREF(Y−1). For example, if X=1 and Y=4, it means that the gamma code is changed from the first gray-scale region GP1 having relative low voltage level to the fourth gray-scale region GP4 having relative high voltage level; at this time, the pre-charging switch unit 32 will pre-charge the input signal INP transmitted to the second input terminal + of the operational amplifier OP to the third pre-charging reference voltage VREF3.

(2) if X>Y, it means that the gamma code is changed from the X-th gray-scale region GPX having relative high voltage level to the Y-th gray-scale region GPY having relative low voltage level; therefore, the pre-charging switch unit 32 will pre-charge the input signal INP transmitted to the second input terminal + of the operational amplifier OP to a Y-th pre-charging reference voltage VREF(Y). For example, if X=3 and Y=1, it means that the gamma code is changed from the third gray-scale region GP3 having relative high voltage level to the first gray-scale region GP1 having relative low voltage level; at this time, the pre-charging switch unit 32 will pre-charge the input signal INP transmitted to the second input terminal + of the operational amplifier OP to the first pre-charging reference voltage VREF1. The rest can be deduced by analogy, and will not be described here.

Figure 5:
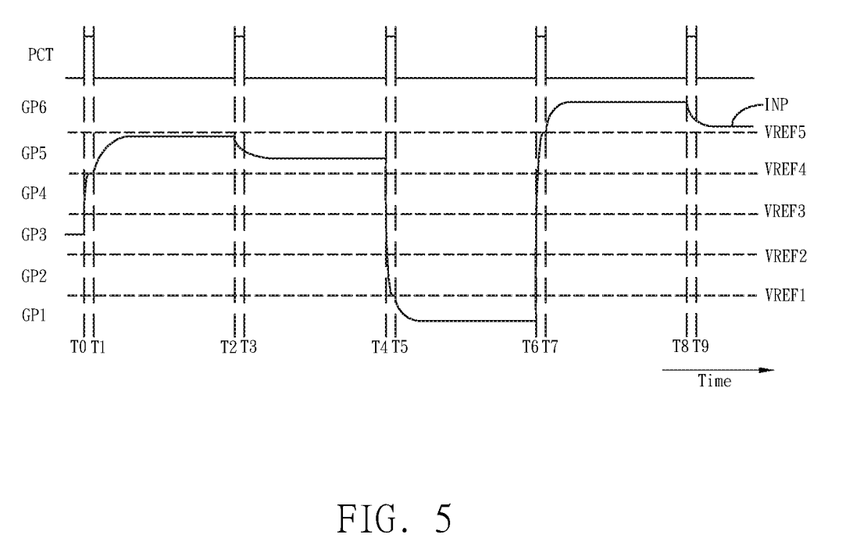
FIG. 5 illustrates an embodiment of determining whether the changing range of the gamma code meets the default condition.

Then, please refer to FIG. 5. FIG. 5 illustrates an embodiment of determining whether the changing range of the gamma code meets the default condition.

As shown in FIG. 5, at first, the pre-charging control unit 30 determines that the input signal INP is changed from the third gray-scale region GP3 having relative low voltage level to the ideal voltage level of the fifth gray-scale region GP5 having relative high voltage level, namely corresponding to the condition of X<Y. At this time, the pre-charging control unit 30 will output the control signal CS to switch the pre-charging switch unit 32 on to pre-charge the input signal INP to the fourth pre-charging reference voltage VREF4 during a first period of pre-charging time (from the time T0 to the time T1), so that the input signal INP can reach the ideal voltage level in the fifth gray-scale region GP5 more quickly during the first period of charging time (from the time T1 to the time T2).

Then, the pre-charging control unit 30 determines that the input signal INP is only changed in the fifth gray-scale region GP5, namely corresponding to the condition of X=Y. Therefore, the pre-charging control unit 30 will mot output the control signal CS, so that the pre-charging switch unit 32 is switched off and will not pre-charge the input signal INP during a second period of pre-charging time (from the time T1 to the time T2).

Next, the pre-charging control unit 30 determines that the input signal INP is changed from the fifth gray-scale region GP5 having relative high voltage level to the ideal voltage level of the first gray-scale region GP1 having relative low voltage level, namely corresponding to the condition of X>Y. At this time, the pre-charging control unit 30 will output the control signal CS to switch the pre-charging switch unit 32 on to pre-charge the input signal INP to the first pre-charging reference voltage VREF1 during a third period of pre-charging time (from the time T4 to the time T5), so that the input signal INP can reach the ideal voltage level in the first gray-scale region GP1 more quickly during the third period of charging time (from the time T5 to the time T6).

Then, the pre-charging control unit 30 determines that the input signal INP is changed from the first gray-scale region GP1 having relative low voltage level to the ideal voltage level of the sixth gray-scale region GP6 having relative high voltage level, namely corresponding to the condition of X<Y. At this time, the pre-charging control unit 30 will output the control signal CS to switch the pre-charging switch unit 32 on to pre-charge the input signal INP to the fifth pre-charging reference voltage VREF5 during a fourth period of pre-charging time (from the time T6 to the time T7), so that the input signal INP can reach the ideal voltage level in the sixth gray-scale region GP6 more quickly during the fourth period of charging time (from the time T7 to the time T8).

At last, the pre-charging control unit 30 determines that the input signal INP is only changed in the sixth gray-scale region GP6, namely corresponding to the condition of X=Y. Therefore, the pre-charging control unit 30 will not output the control signal CS, so that the pre-charging switch unit 32 is switched off and will not pre-charge the input signal INP during a fifth period of pre-charging time (from the time T8 to the time T9).

Figure 6:
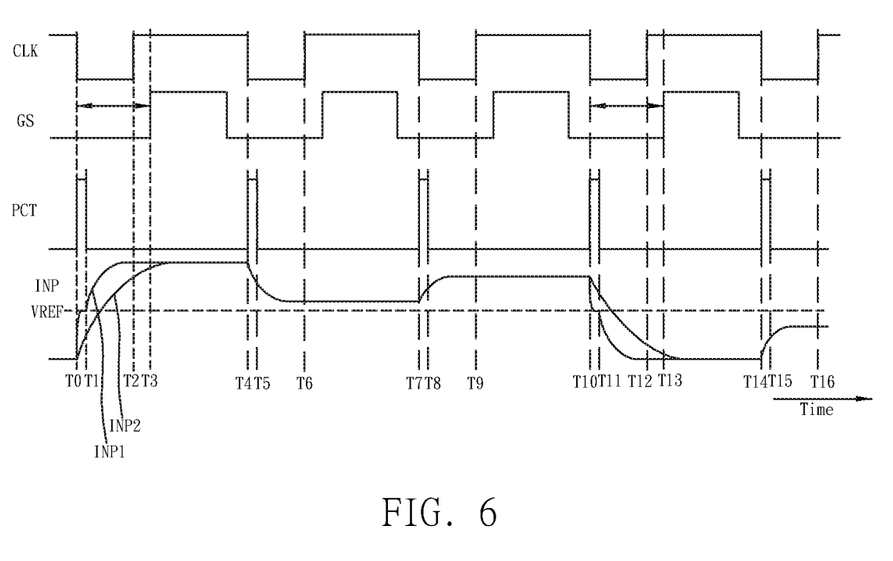
FIG. 6 illustrates a timing diagram of the pre-charging circuit pre-charging the input signal of the operational amplifier in a preferred embodiment of the invention.

Next, please refer to FIG. 6. FIG. 6 illustrates a timing diagram of the pre-charging circuit pre-charging the input signal of the operational amplifier in a preferred embodiment of the invention.

As shown in FIG. 6, if the entire gray-scale range is only divided into two gray-scale regions GPA~GPB by the pre-charging reference voltage VREF, at the time T0, the charging signal CLK is changed from high-level to low-level and starts to charge the liquid crystal display panel PL, the gate control signal GS is maintained as low-level and fails to conduct the gate electrode G of the transistor TFT, and the pre-charging signal PCT is changed from low-level to high-level and enters into the first period of charging time (from the time T0 to the time T1). At this time, if the pre-charging control unit 30 determines that the input signal INP1 is changed from the gray-scale region GPA having relative low voltage level to the ideal voltage level in the gray-scale region GPB having relative high voltage level, then the pre-charging switch unit 32 will be switched on to pre-charge the input signal INP1 to the pre-charging reference voltage VREF during the first period of pre-charging time (from the time T0 to the time T1), so that the input signal INP1 can reach the ideal voltage level in the gray-scale region GPB more quickly during the following charging time (from the time T1 to the time T2). Therefore, when the gate control signal GS is changed from low-level to high-level to conduct the gate electrode G of the transistor TFT at the time T3, the input signal INP1 transmitted to the second input terminal + of the operational amplifier OP has already reached the ideal voltage level; therefore, the operational amplifier OP can complete the charging of the liquid crystal display panel PL within the limited charging time (from the time T0 to the time T2) and the liquid crystal display panel PL can display picture normally.

As to the input signal INP2, the input signal INP2 is not pre-charged in the prior art. When the gate control signal GS is changed from low-level to high-level at the time T3 to conduct the gate electrode G of the transistor TFT, since the input signal INP2 transmitted to the second input terminal + of the operational amplifier OP does not reach the ideal voltage level yet, the operational amplifier OP cannot complete the charging of the liquid crystal display panel PL within the limited charging time (the time T0 to the time T2), so that the liquid crystal display panel PL fails to display picture normally.

At the time T4, the charging signal CLK is changed from high-level to low-level again to start to charge the liquid crystal display panel PL, the gate control signal GS is maintained at low-level and does not conduct the gate electrode G of the transistor TFT, and the pre-charging signal PCT is changed from low-level to high-level and enters into the second period of pre-charging time (the time T4 to the time T5). At this time, if the pre-charging control unit 30 determines that the input signal INP1 is only changed to the ideal voltage level in the same gray-scale region GPB, then the pre-charging switch unit 32 in maintained switched off and will not pre-charge the input signal INP1 during the second period of pre-charging time (the time t4 to the time t5).

Similarly, at the time T7, the charging signal CLK is changed from high-level to low-level again to start to charge the liquid crystal display panel PL, the gate control signal GS is maintained at low-level and does not conduct the gate electrode G of the transistor TFT, and the pre-charging signal PCT is changed from low-level to high-level and enters into the third period of pre-charging time (the time T7 to the time T8). At this time, if the pre-charging control unit 30 determines that the input signal INP1 is only changed to the ideal voltage level in the same gray-scale region GPB, then the pre-charging switch unit 32 in maintained switched off and will not pre-charge the input signal INP1 during the third period of pre-charging time (the time t7 to the time t8).

At the time T10, the charging signal CLK is changed from high-level to low-level again to start to charge the liquid crystal display panel PL, the gate control signal GS is maintained at low-level and does not conduct the gate electrode G of the transistor TFT and the pre-charging signal PCT is changed from low-level to high-level and enters into the fourth period of pre-charging time (the time T10 to the time T11). At this time, if the pre-charging control unit 30 determines that the input signal INP1 is changed from to the gray-scale region GPB having relative high voltage level to the ideal voltage level in the gray-scale region GPA having relative low voltage level, then the pre-charging switch unit 32 is switched on to pre-charge the input signal INP1 to the pre-charging reference voltage VREF during the fourth period of pre-charging time (the time t10 to the time t11), so that the input signal INP1 can reach the ideal voltage level in the gray-scale region GPA more quickly during the following charging time (from the time T11 to the time T12). Therefore, when the gate control signal GS is changed from high-level to low-level to conduct the gate electrode G of the transistor TFT at the time T13, since the input signal INP1 transmitted to the second input terminal + of the operational amplifier OP has already reached the ideal voltage level; therefore, the operational amplifier OP can complete the charging of the liquid crystal display panel PL within the limited charging time (from the time T10 to the time T12) and the liquid crystal display panel PL can display picture normally.

At the time T14, the charging signal CLK is changed from high-level to low-level again to start to charge the liquid crystal display panel PL, the gate control signal GS is maintained at low-level and does not conduct the gate electrode G of the transistor TFT, and the pre-charging signal PCT is changed from low-level to high-level and enters into the fifth period of pre-charging time (the time T14 to the time T15). At this time, if the pre-charging control unit 30 determines that the input signal INP1 is only changed to the ideal voltage level in the same gray-scale region GPA, then the pre-charging switch unit 32 in maintained switched off and will not pre-charge the input signal INP1 during the fifth period of pre-charging time (the time T14 to the time T15).

Another preferred embodiment of the invention is a pre-charging method applied to a source driver. In this embodiment, the source driver is coupled to a liquid crystal display panel, the source driver includes a digital-analog converter and an operational amplifier. The operational amplifier includes a first input terminal, a second input terminal and an output terminal. The first input terminal is coupled to the output terminal and the second input terminal is coupled to the digital-analog converter. A pre-charging switch unit is coupled to the second input terminal of the operational amplifier.

Figure 7:
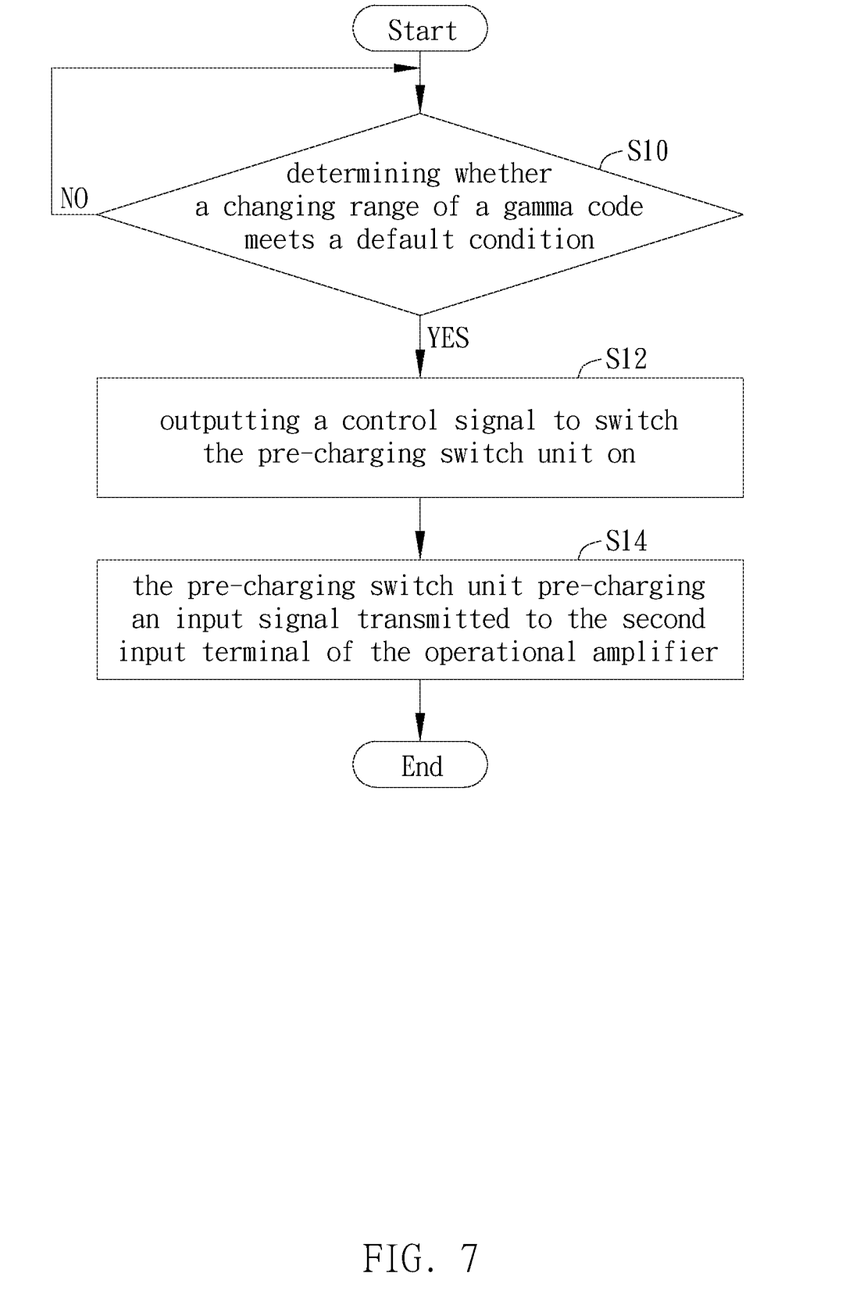
FIG. 7 illustrates a flowchart of a pre-charging method in a preferred embodiment of the invention.

Please refer to FIG. 7. FIG. 7 illustrates a flowchart of a pre-charging method in this embodiment. As shown in FIG. 7, the pre-charging method includes steps of:

S10: determining whether a changing range of a gamma code meets a default condition, wherein the source driver further includes a gamma unit and the gamma code in the step S10 is provided by the gamma unit;

S12: if a determining result of the step S10 is YES, outputting a control signal to switch the pre-charging switch unit on; and S14: when the pre-charging switch unit is switched on, the pre-charging switch unit pre-charging an input signal transmitted to the second input terminal of the operational amplifier.

It should be noticed that if the determining result of the step S10 is NO, the method will not output the control signal, so that the pre-charging switch unit is switched off and does not pre-charge the input signal transmitted to the second input terminal of the operational amplifier.

In practical applications, the method can also divide a gray-scale range into N gray-scale regions through (N−1) default gamma codes, wherein N is a positive integer larger than 1. The (N−1) default gamma codes can include a first default gamma code, . . . , and a (N−1)-th default gamma code arranged from low voltage level to high voltage level; the N gray-scale regions comprises a first gray-scale region, . . . , and a N-th gray-scale region.

In an embodiment, the default condition in the step S10 is that the gamma code is changed from a X-th gray-scale region of the N gray-scale regions to a Y-th gray-scale region of the N gray-scale regions, wherein X and Y are positive integers, and $1 \leq X, Y \leq N$ and $X \neq Y$. The (N−1) default gamma codes correspond to (N−1) pre-charging reference voltages comprising a first pre-charging reference voltage, . . . , and a (N−1)-th pre-charging reference voltage.

Since $X \neq Y$, it can include the following two conditions:
(1) if $X < Y$, the gamma code is changed from the X-th gray-scale region having relative low voltage level to the Y-th gray-scale region having relative high voltage level, and the pre-charging switch unit will pre-charge the input signal transmitted to the second input terminal of the operational amplifier to a (Y−1)-th pre-charging reference voltage. For example, if X=2 and Y=5, the gamma code is changed from the second gray-scale region having relative low voltage level to the fifth gray-scale region having relative high voltage level, and the pre-charging switch unit will pre-charge the input signal transmitted to the second input terminal of the operational amplifier to a fourth pre-charging reference voltage VREF(4).

(2) if X>Y, the gamma code is changed from the X-th gray-scale region having relative high voltage level to the Y-th gray-scale region having relative low voltage level, and the pre-charging switch unit will pre-charge the input signal transmitted to the second input terminal of the operational amplifier to a Y-th pre-charging reference voltage. For example, if X=4 and Y=1, the gamma code is changed from the fourth gray-scale region having relative high voltage level to the first gray-scale region having relative low voltage level, and the pre-charging switch unit will pre-charge the input signal transmitted to the second input terminal of the operational amplifier to a first pre-charging reference voltage VREF(1). The rest can be deduced by analogy, and will not be described here.

Compared to the prior art, the pre-charging circuit and the pre-charging method of the present invention are applied to a source driver of a liquid crystal display device, when a gamma code requires a large voltage level change to change between different gray scale regions, the pre-charging circuit and the pre-charging method of the present invention will pre-charge the input signal transmitted to the positive input terminal of the operational amplifier to speed up the input signal to the desired voltage level, so that the operational amplifier can charge the liquid crystal display panel within a limited charging time. As a result, the liquid crystal display panel can display the picture normally and the problems encountered in the prior art can be effectively overcome.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A pre-charging circuit, applied to a source driver coupled to a liquid crystal display panel, the source driver comprising a digital-analog converter and an operational amplifier, the operational amplifier comprising a first input terminal, a second input terminal and an output terminal, the first input terminal being coupled to the output terminal and the second input terminal being coupled to the digital-analog converter, the pre-charging circuit comprising:
   a pre-charging control unit, configured to determine whether a changing range of a gamma code meets a default condition, if a determining result of the pre-charging control unit is YES, the pre-charging control unit outputting a control signal; and
   a pre-charging switch unit, coupled between the pre-charging control unit and the second input terminal of the operational amplifier, when the control signal switches the pre-charging switch unit on, the pre-charging switch unit pre-charging an input signal transmitted to the second input terminal of the operational amplifier;
   wherein the pre-charging control unit divides a gray-scale range into N gray-scale regions through (N−1) default gamma codes, N is a positive integer larger than 1, the (N−1) default gamma codes comprise a first default gamma code, . . . , and a (N−1)-th default gamma code arranged from low voltage level to high voltage level; the N gray-scale regions comprises a first gray-scale region, . . . , and a N-th gray-scale region; the default condition is that the gamma code is changed from a X-th gray-scale region of the N gray-scale regions to a Y-th gray-scale region of the N gray-scale regions, X and Y are positive integers, and 1≤X, Y≤N and X≠Y; the (N−1) default gamma codes correspond to (N−1) pre-charging reference voltages comprising a first pre-charging reference voltage, . . . , and a (N−1)-th pre-charging reference voltage; if X<Y, the gamma code is changed from the X-th gray-scale region having relative low voltage level to the Y-th gray-scale region having relative high voltage level, and the pre-charging switch unit pre-charges the input signal transmitted to the second input terminal of the operational amplifier to a (Y−1)-th pre-charging reference voltage.

2. The pre-charging circuit of claim 1, wherein if the determining result of the pre-charging control unit is NO, the pre-charging control unit does not output the control signal, so that the pre-charging switch unit is switched off and does not pre-charge the input signal transmitted to the second input terminal of the operational amplifier.

3. The pre-charging circuit of claim 1, wherein the source driver further comprises a gamma unit coupled to the pre-charging control unit and the pre-charging switch unit respectively, the gamma unit provides the gamma code to the pre-charging control unit and the pre-charging switch unit respectively.

4. A pre-charging circuit, applied to a source driver coupled to a liquid crystal display panel, the source driver comprising a digital-analog converter and an operational amplifier, the operational amplifier comprising a first input terminal, a second input terminal and an output terminal, the first input terminal being coupled to the output terminal and the second input terminal being coupled to the digital-analog converter, the pre-charging circuit comprising:
   a pre-charging control unit, configured to determine whether a changing range of a gamma code meets a default condition, if a determining result of the pre-charging control unit is YES, the pre-charging control unit outputting a control signal; and
   a pre-charging switch unit, coupled between the pre-charging control unit and the second input terminal of the operational amplifier, when the control signal switches the pre-charging switch unit on, the pre-charging switch unit pre-charging an input signal transmitted to the second input terminal of the operational amplifier;
   wherein the pre-charging control unit divides a gray-scale range into N gray-scale regions through (N−1) default gamma codes, N is a positive integer larger than 1, the (N−1) default gamma codes comprise a first default gamma code, . . . , and a (N−1)-th default gamma code arranged from low voltage level to high voltage level; the N gray-scale regions comprises a first gray-scale region, . . . , and a N-th gray-scale region; the default condition is that the gamma code is changed from a X-th gray-scale region of the N gray-scale regions to a Y-th gray-scale region of the N gray-scale regions, X and Y are positive integers, and 1≤X, Y≤N and X≠Y; the (N−1) default gamma codes correspond to (N−1) pre-charging reference voltages comprising a first pre-charging reference voltage, . . . , and a (N−1)-th pre-charging reference voltage; if X>Y, the gamma code is changed from the X-th gray-scale region having relative high voltage level to the Y-th gray-scale region having relative low voltage level, and the pre-charging switch unit pre-charges the input signal transmitted to the second input terminal of the operational amplifier to a Y-th pre-charging reference voltage.

5. A pre-charging method, applied to a source driver coupled to a liquid crystal display panel, the source driver comprising a digital-analog converter and an operational amplifier, the operational amplifier comprising a first input terminal, a second input terminal and an output terminal, the first input terminal being coupled to the output terminal and the second input terminal being coupled to the digital-analog converter, a pre-charging switch unit being coupled to the second input terminal of the operational amplifier, the pre-charging method comprising steps of:
  (a) determining whether a changing range of a gamma code meets a default condition;
  (b) if a determining result of the step (a) is YES, outputting a control signal to switch the pre-charging switch unit on; and
  (c) the pre-charging switch unit pre-charging an input signal transmitted to the second input terminal of the operational amplifier,
  wherein the pre-charging method further comprises a step of:
  dividing a gray-scale range into N gray-scale regions through (N−1) default gamma codes;
  wherein N is a positive integer larger than 1, the (N−1) default gamma codes comprise a first default gamma code, . . . , and a (N−1)-th default gamma code arranged from low voltage level to high voltage level; the N gray-scale regions comprises a first gray-scale region, . . . , and a N-th gray-scale region; the default condition is that the gamma code is changed from a X-th gray-scale region of the N gray-scale regions to a Y-th gray-scale region of the N gray-scale regions, X and Y are positive integers, and 1≤X, Y≤N and X≠Y; the (N−1) default gamma codes correspond to (N−1) pre-charging reference voltages comprising a first pre-charging reference voltage, . . . , and a (N−1)-th pre-charging reference voltage; if X<Y, the gamma code is changed from the X-th gray-scale region having relative low voltage level to the Y-th gray-scale region having relative high voltage level, and the pre-charging switch unit pre-charges the input signal transmitted to the second input terminal of the operational amplifier to a (Y−1)-th pre-charging reference voltage.

6. The pre-charging method of claim 5, wherein if the determining result of the step (a) is NO, the control signal is not outputted to the pre-charging switch unit, so that the pre-charging switch unit is switched off and does not pre-charge the input signal transmitted to the second input terminal of the operational amplifier.

7. The pre-charging method of claim 5, wherein the source driver further comprises a gamma unit providing the gamma code in the step (a).

8. The pre-charging method of claim 5, wherein if X>Y, the gamma code is changed from the X-th gray-scale region having relative high voltage level to the Y-th gray-scale region having relative low voltage level, and the pre-charging switch unit pre-charges the input signal transmitted to the second input terminal of the operational amplifier to a Y-th pre-charging reference voltage.

* * * * *